(12) United States Patent
Nagasaka

(10) Patent No.: US 6,231,106 B1
(45) Date of Patent: May 15, 2001

(54) CAP UNIT FOR FUEL TANK OF VEHICLE

(75) Inventor: Munenori Nagasaka, Shizuoka-Ken (JP)

(73) Assignee: Suzuki Kaisha Toshiba, Hamamatsu (JP)

( * ) Notice: Subject to any disclaimer, the term of this patent is extended or adjusted under 35 U.S.C. 154(b) by 0 days.

(21) Appl. No.: 09/358,693

(22) Filed: Jul. 21, 1999

(30) Foreign Application Priority Data

Jul. 22, 1998 (JP) .................................................. 10-206943

(51) Int. Cl.⁷ .................................................. B60K 15/05
(52) U.S. Cl. .................................. 296/97.22; 220/DIG. 33
(58) Field of Search ................. 296/97.22; 220/DIG. 33, 220/86.2

(56) References Cited

U.S. PATENT DOCUMENTS

| | | | | |
|---|---|---|---|---|
| 4,784,423 | * | 11/1988 | Pardy | 296/97.22 |
| 5,066,062 | * | 11/1991 | Sekulovski | 296/97.22 |
| 5,253,920 | * | 10/1993 | Eldridge | 296/97.22 |
| 5,533,766 | * | 7/1996 | Farber | 296/97.22 |
| 5,658,036 | * | 8/1997 | Benoist | 296/97.22 |
| 5,732,842 | * | 3/1998 | Krause et al. | 296/97.22 |
| 5,884,958 | * | 3/1999 | Oddenino | 296/97.22 |

* cited by examiner

Primary Examiner—D. Glenn Dayoan
Assistant Examiner—G Blankenship
(74) Attorney, Agent, or Firm—Finnegan, Henderson, Farabow, Garrett & Dunner, L.L.P.

(57) ABSTRACT

A cap unit for a fuel tank of a vehicle for closing a fuel supply port formed to the fuel tank comprises a cap body to be applied in a pivotal manner through a pivot shaft to the fuel supply port formed to the fuel tank, a mount base through which the cap body is mounted to the fuel supply port and a lock member provided for the cap body. The lock member includes a lock bar formed to a side portion of cap body, an engaging portion formed to the fuel supply port to be engageable with the the lock bar to lock the cap body when the cap body is applied to the fuel support port, and an engaging projection formed to another side portion of the cap body substantially at an opposite portion of the lock bar to be engageable with the engaging portion formed to the fuel supply port. The engaging projection has a surface inclining upward towards a center portion of the cap body in an installed state of the fuel tank.

7 Claims, 5 Drawing Sheets

CAP UNIT FOR FUEL TANK OF VEHICLE

BACKGROUND OF THE INVENTION

The present invention relates to a cap unit for a fuel tank of a vehicle.

Vehicles, such as a motorcycle, incorporate a fuel tank for storing fuel which is supplied to an engine thereof, the fuel tank having a fuel supply port, at its upper end portion when mounted, which is closed by a cap unit.

A cap unit 5 has a structure formed as shown in FIG. 5 and incorporate a cap body 2 for closing a fuel supply port 1 which is brought to a locked state by engaging a front claw 3a of one lock bar 3 to an engaging portion 4 provided for the fuel supply port 1.

The cap body 5 is brought to an unlocked state by disengaging the front law 3a of one lock bar 3 from the engaging portion 4.

The cap unit 5 further incorporates a mount base 6 having the cap body 2 extending therefrom. The mount base 6 is secured to a mount base securing portion a fuel tank 7 by one of more bolts (not shown) and is pivotable around a hinge pin. Thus, in the unlocked state, pivotally rotating the mount base 6 rotates the cap body and thereby opens or closes of the fuel supply port 1. However, if the one or more bolts are loosened because of inadequate maintenance or intentional removal, the overall body of the cap unit 5, even in the locked state, may be removed by, for example, scooping out the cap unit 5. If the cap unit 5 in its locked state can be removed from the fuel supply port 1, fuel may be stolen easily. Furthermore, there is a possibility that fuel may rapidly leak out of the fuel tank 7 unknowingly. There has been provided (refer to Japanese Patent Laid-Open Publication No. HEI 9-24874) which incorporates an engaging projection 8 provided for the outer wall, side portion, of the cap body 2 on the rear of the lock bar 3. When the overall body of the cap unit 5 is moved upward in the lock state in which the front claw 3a of the lock bar 3 is engaged to the engaging portion 4, the engaging projection 8 is engaged to the engaging portion 4.

The contact of the engaging projection 8 to the engaging portion 4 must be prevented during a usual operation for opening or closing the cap body 2. Therefore, as shown in FIG. 5, somewhat long distance x is required between a locus 9 of the engaging projection 8 when the cap body 2 is opened or closed and the lower end of the engaging portion 4. However, if the distance x is too long, the original function, that is, prevention of the removal of the overall body of the cap unit 5 owning to the scoop-out of the cap unit 5 cannot be realized. Therefore, each of distances y and z between the engaging projection 8 and the engaging portion 4 must have great dimension accuracy.

If the distance y between the upper surface of the engaging projection 8 and the lower end of the engaging portion 4 is too large in order to prevent contact of the engaging projection 8 to the engaging portion 4 when the cap body 2 is opened or closed, looseness sometimes takes place in a state in which the bolt for securing the mount base 6 to the fuel tank 7 is loosened or in a state of no bolt. Therefore, the hermeticity of the fuel, tank 7 is sometimes deteriorated. If the distances y and z between the engaging projection 8 and the engaging portion 4 are too short, there is apprehension that the engaging projection 8 is brought into contact to the fuel supply port 1 when the cap body 2 is opened or closed.

SUMMARY OF THE INVENTION

In view of the foregoing, an object of the present invention is to provide a cap unit for a fuel tank of a vehicle which has a simple structure and which is capable of preventing the overall body of the cap unit from coming off without requiring the improvement of dimension accuracy.

This and other objects can be achieved according to the present invention by providing a cap unit for a fuel tank of a vehicle for closing a fuel supply port formed to the fuel tank, comprising:

a cap body to be applied in a pivotal manner through a pivot shaft to the fuel supply port formed to the fuel tank;

a mount base through which the cap body is mounted to the fuel supply port; and a lock means provided for the cap body, the lock means including a lock bar formed to a side portion of cap body, an engaging portion formed to the fuel supply port to be engageable with the the lock bar to lock the cap body when the cap body is applied to the fuel support port, and an engaging projection formed to another side portion of the cap body substantially at an opposite portion of the lock bar to be engageable with the engaging portion formed to the fuel supply port, the engaging projection having a surface inclining upward towards a center portion of the cap body in an installed state of the fuel tank.

In a preferred embodiment, the inclining surface is formed to be in parallel to a tangent of a circular arc, with the pivot shaft being a center thereof, which passes through a lower end of the engaging portion, the tangent being a tangent passing through a lower end portion of the engaging portion in a state in which the cap body is closed. The engaging portion, with which the lock bar and the engaging projection are engaged, is formed by bending inward an opening end portion of the fuel supply port.

According to the characteristic structure of the present invention mentioned above, the cap unit for a fuel tank includes a cap body which is pivotally joined to the fuel supply port. The lock bar of the locking unit mounted in the cap body is engaged with an engaging portion provided for the fuel supply port so that the cap body is brought to a lock state, and an engaging projection which can be engaged with the engaging portion is provided for the side portion of the cap body on the rear side of the lock bar, and the upper surface of the engaging projection is formed to an inclined surface which is raised towards the center of the cap body. Therefore, only a simple structure is required to prevent the overall body of the cap unit from coming off. Furthermore, if the secured cap unit is loosened, occurrence of coming-off can be prevented. As a result, the hermeticity of the fuel tank can be improved.

The inclined surface is formed to be in parallel to a tangent of a circular arc, the center of which is a pivot shaft of the cap body and which passes through a lower end of the engaging portion, the tangent being a tangent passing through a lower end of the engaging portion. Therefore, great dimension accuracy is not required for the distance between the engaging projection and the engaging portion to reduce looseness of the cap unit. Therefore, only a simple structure is required to prevent the overall body of the cap unit from coming off.

DESCRIPTION OF THE PREFERRED EMBODIMENT

An embodiment of the present invention will now be described with reference to the drawings.

Figure 1:
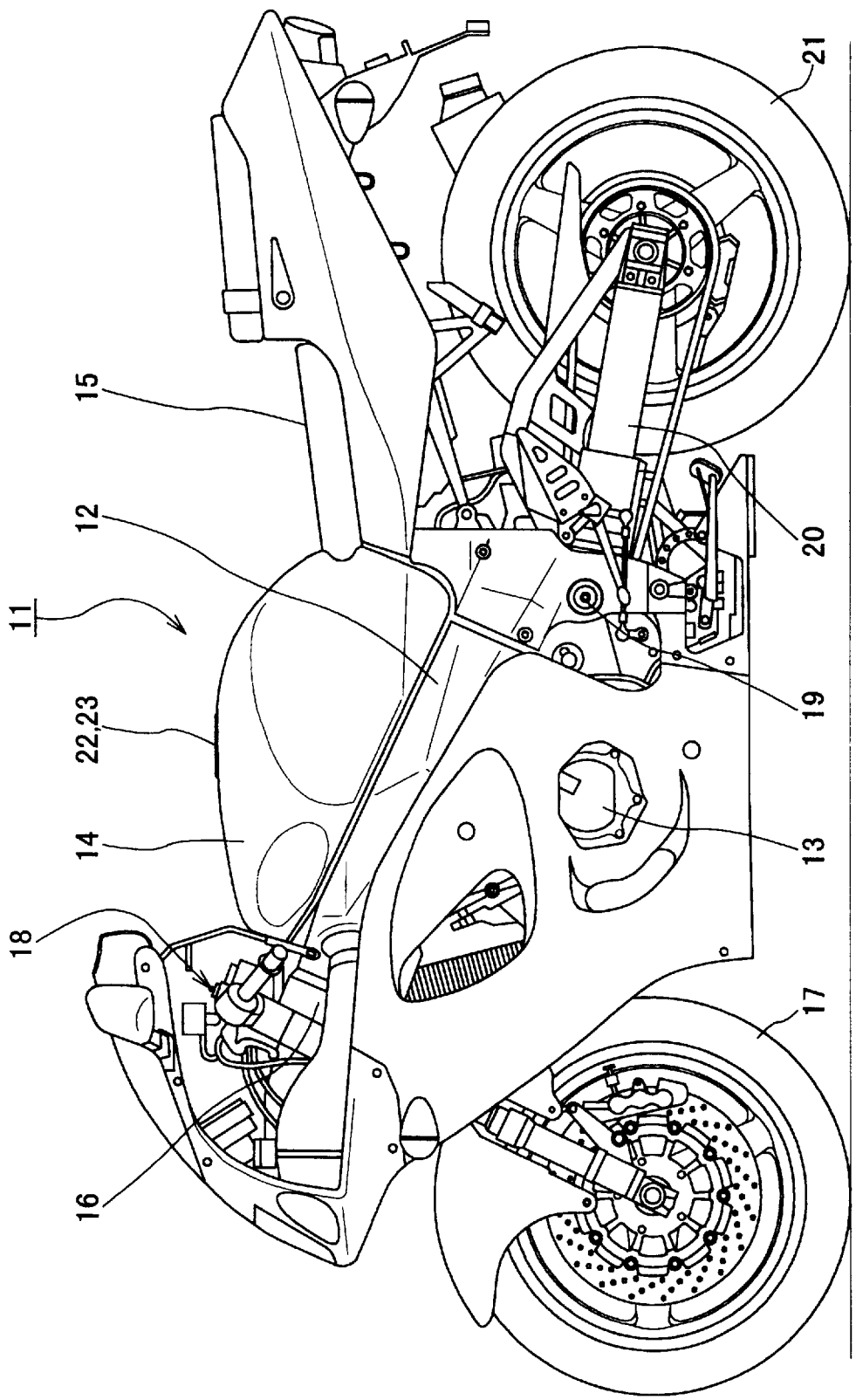
FIG. 1 is a left-hand side view showing a motorcycle for illustrating an embodiment of a cap unit for a fuel tank of a vehicle, in a usable state, according to the present invention.

FIG. 1 is a left-hand side view showing a motorcycle which is a vehicle to which the present invention is applicable. As shown in FIG. 1, the motorcycle 11 incorporates a body frame 12. An engine 13 is mounted on the lower portion of the central portion of the body frame 12. A fuel tank 14 is mounted above the engine 13. A driver's seat 15 is disposed in the rear of the fuel tank 14.

A head pipe 16 is disposed in front of the body frame 12. A steering mechanism 18 for rotatively supporting a front wheel 17 is provided for the head pipe 16. On the other hand, a swing arm 20 is joined to a pivot shaft 19 disposed in the lower portion of the central portion of the body frame 12 so that the swing arm 20 is able to swing around the pivot shaft 19. A rear wheel 21 is rotatively supported at the rear end of the swing arm 20.

Figure 2:
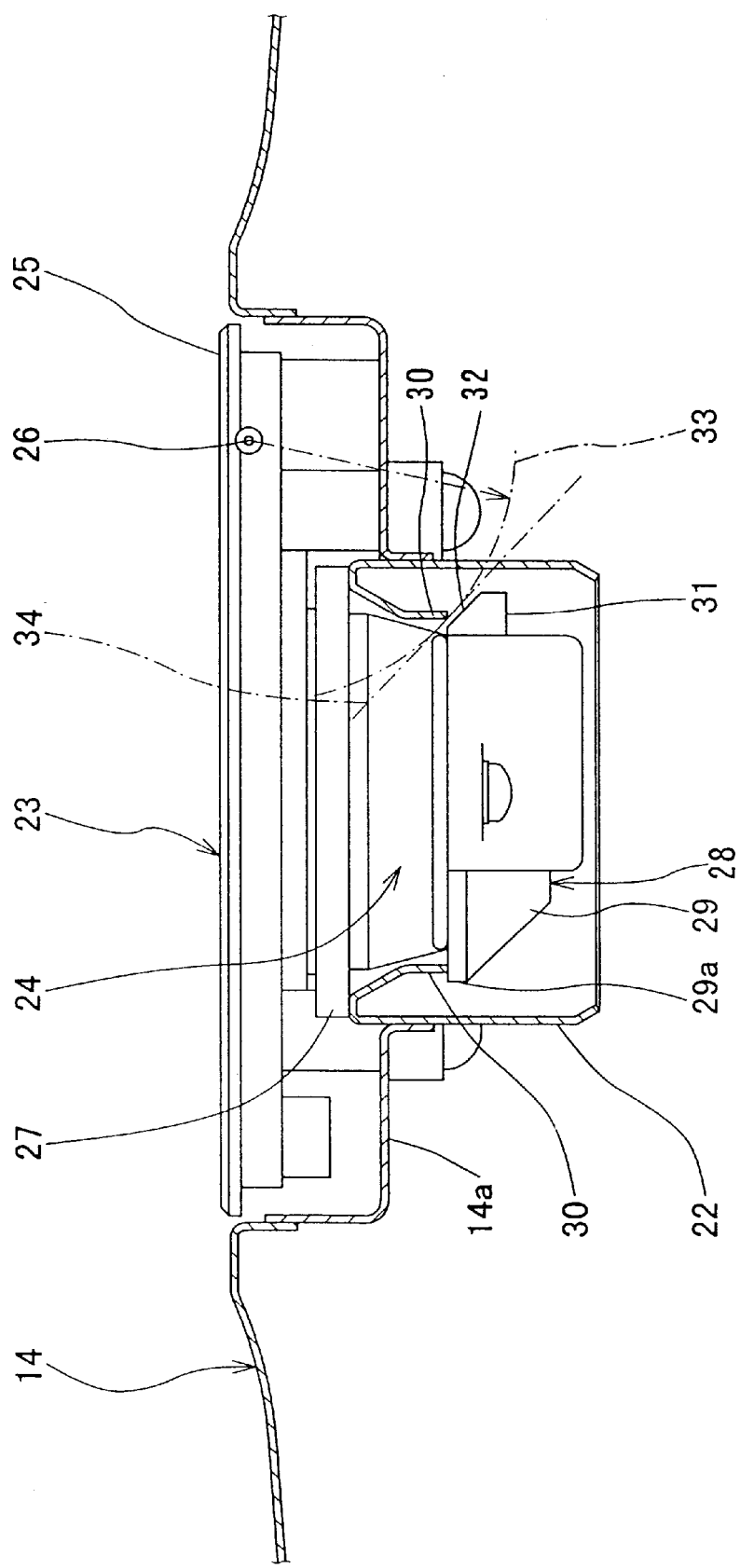
FIG. 2 is an enlarged vertical cross sectional view showing a fuel supply port.

A fuel supply port 22 is formed in the upper surface of the fuel tank 14. FIG. 2 is an enlarged vertical cross sectional view showing the fuel supply port 22. As shown in FIG. 2, the fuel supply port 22 is closed by a cap unit 23 which is a fuel cap. The cap unit 23 incorporates a cap body 24 and an annular mount base 25 disposed around a head portion of the cap body 24. The cap body 24 can arbitrarily be opened and closed because its hinge portion is rotatably supported by the mount base 25 through a hinge pin 26 which is a pivot shaft. On the other hand, the mount base 25 is, with a plurality of bolts (not shown), secured to a mount base securing portion 14a provided for the fuel supply port 22 of the fuel tank 14.

An annular packing 27 is disposed on the outer surface of an intermediate portion of the cap body 24. The packing 27 is always pressed against the upper end of the fuel supply port 22 in a state in which the cap body 24 is closed thereby to close the fuel supply port 22 in a fluid-tight manner.

A locking unit 28 is disposed in the inside portion of the lower portion of the cap body 24. The locking unit 28 incorporates a lock bar 29 which is capable of moving/retracting sideward by means of key, for example. A front claw 29a of the lock bar 29 is engaged with an engaging portion 30 provided for the inner surface of the fuel supply port 22 so that the cap body 24 is brought to a locked state (lock "ON").

When the locked state of the locking unit 28 is released by using a key, not shown, the lock bar 29 is provided for the cap body 24 so that the locked state of the cap body 24 is released (unlocked, i.e. lock "OFF").

An engaging projection 31 is formed on the outer wall, side portion, of the cap body 24 on the opposite rear side of the lock bar 29. The engaging projection 31 is formed into a tapered inclined surface 32 having an upper surface which is inclined upward towards the central portion of the cap body 24. The inclined surface 32 of the engaging projection 31 is formed to be in parallel to a tangent 34 of a circular arc 33 at the lower end of the lock bar 29 when the circular arc 33 is drawn with the hinge pin 26, which is the pivot shaft of the cap body 24, being the center of the pivotal motion, the circular arc 33 passing through the lower end of the engaging portion 30 in a state in which the cap body 24 has been closed.

Figure 3:
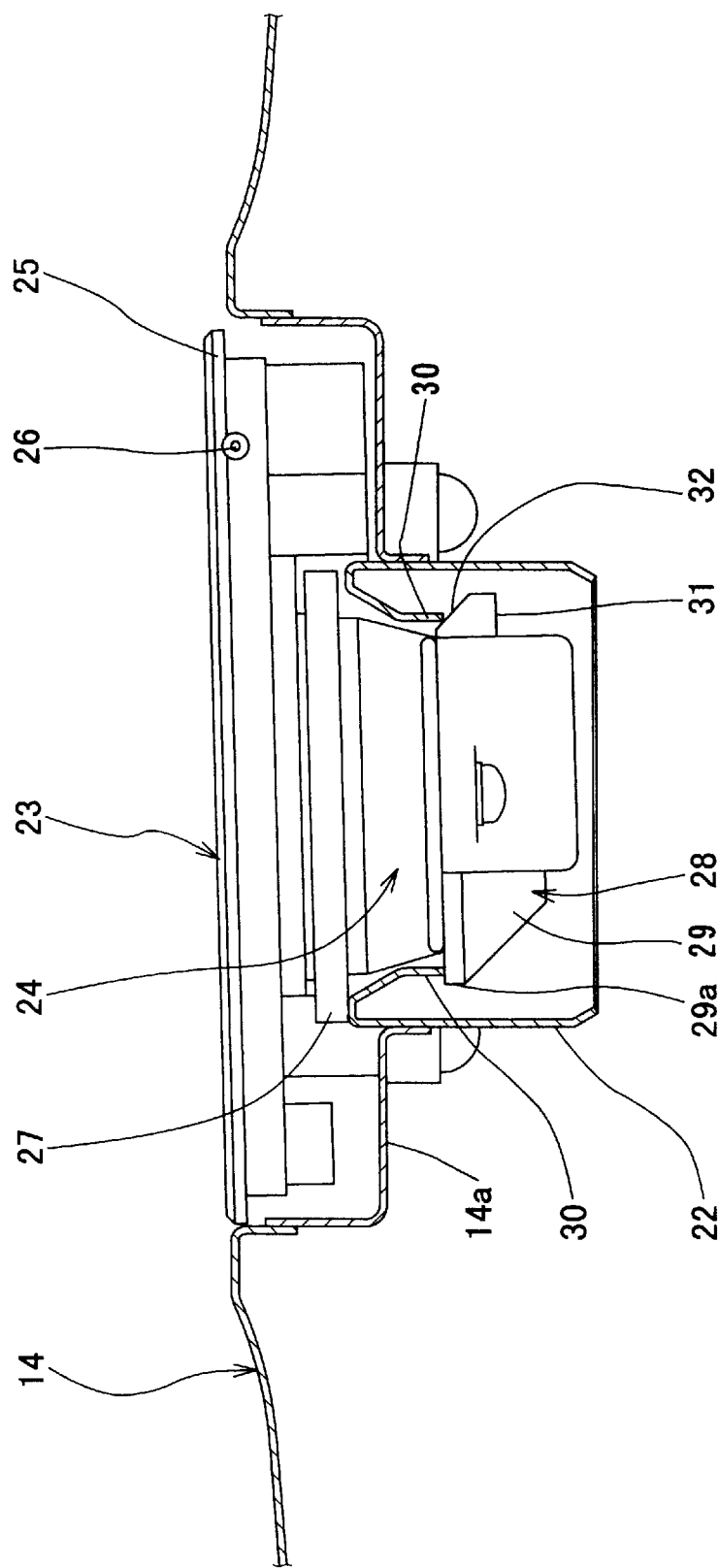
FIG. 3 is an enlarged vertical cross sectional view showing the fuel supply port in a state in which the overall body of the cap unit is raised in a locked state.

As shown in FIG. 3, the engaging projection 31 is structured to be engaged to the engaging portion 30 provided for the fuel supply port 22, for example, by bending inward an opening end portion thereof, in the locked a state in which the front claw 29a of the locking unit 28 is projected and engaged with the engaging portion 30. Therefore, if the overall body of the cap unit 23 is moved upward, the overall body of the cap unit 23 can be prevented from coming off.

The operation of this embodiment will now be described.

Figure 4:
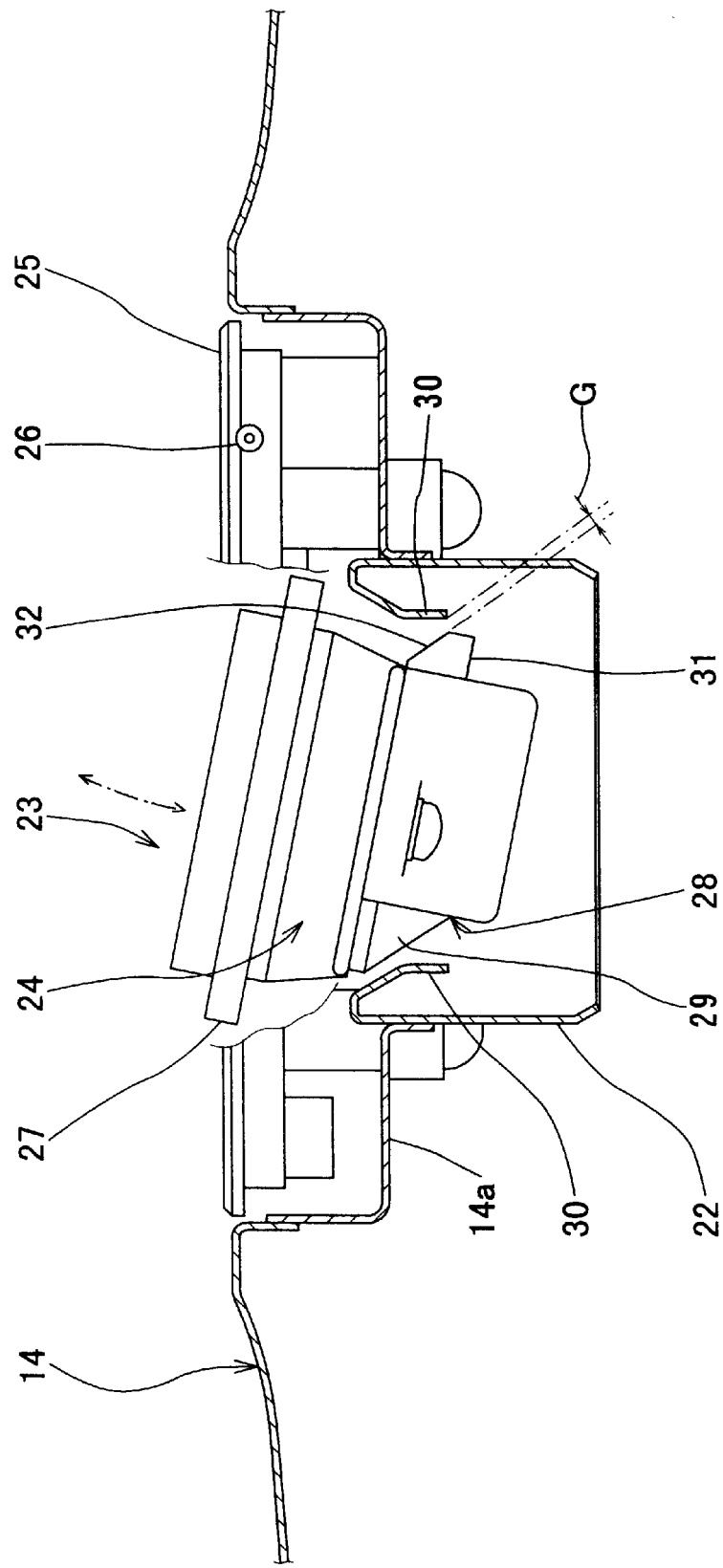
FIG. 4 is an enlarged vertical cross sectional view showing the fuel supply port in a state in which a cap body is opened or closed in an unlocked state.
Figure 5:
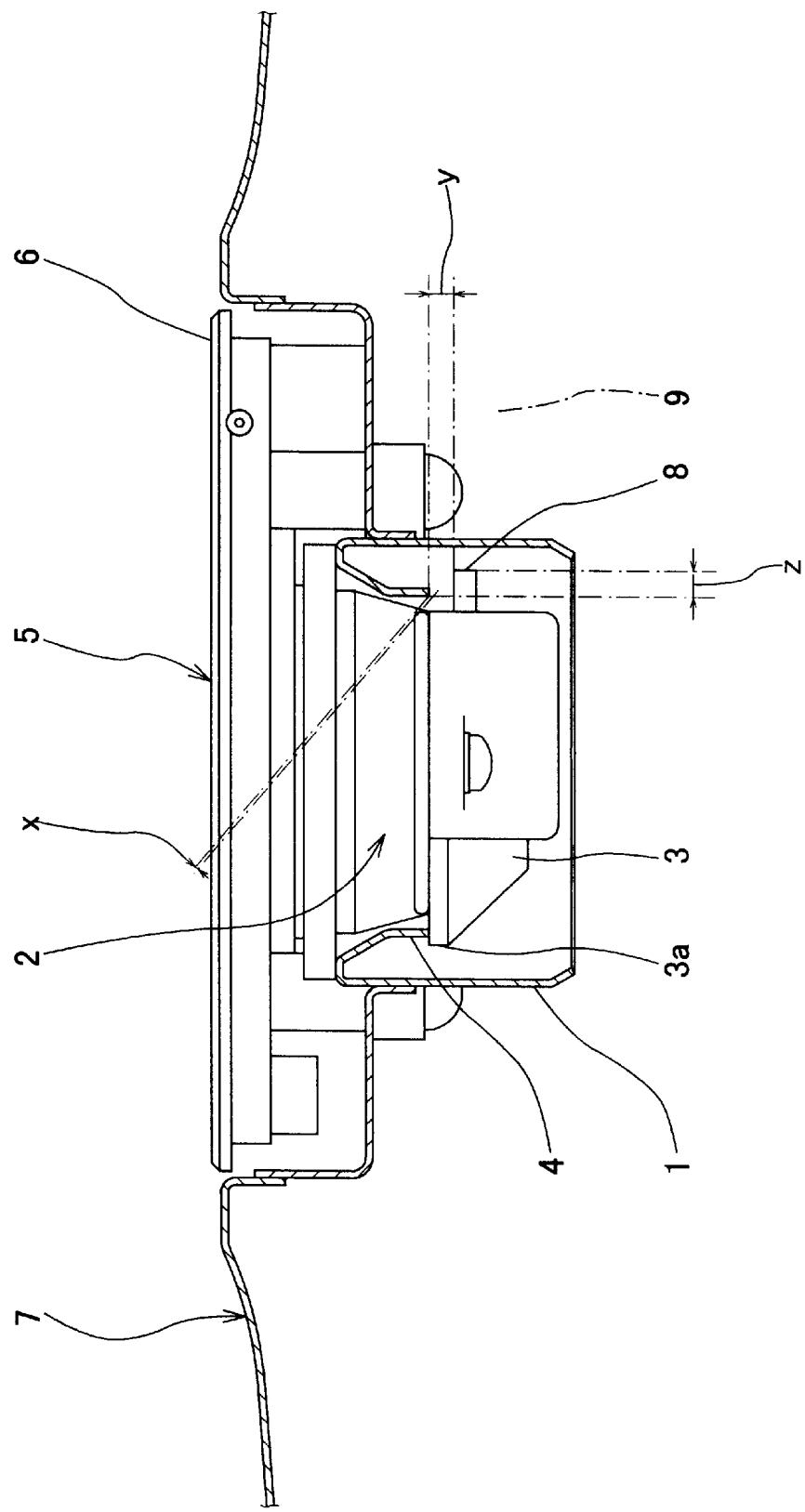
FIG. 5 is an enlarged vertical cross sectional view showing a conventional fuel supply port.

The upper surface of the engaging projection 31 is formed into the inclined surface 32 which is raised towards the center of the cap body 24. In a state in which the cap body 24 is closed, the inclined surface 32 is formed to be in parallel to the tangent 34 being a tangent passing through a lower end of the engaging portion 30 of a circular arc 33, the center of which is the hinge pin 26 which is the pivot shaft of the cap body 24 and which passes through a lower end of the engaging portion 30. Therefore, great dimension accuracy is not required for the distance between the engaging projection 31 and the engaging portion 30 to prevent the engaging projection 31 from contacting the engaging portion 30 when the cap body 24 is opened or closed in the unlocked state as shown in FIG. 4. As a result, the engaging portion 30 provided for the fuel supply port 22 and the inclined surface 32 of the engaging projection 31 can be formed adjacently. When the joining bolt is removed, looseness of the fuel cap can be minimized. Moreover, the engaging projection 31 can easily be manufactured, thus reducing cost.

Since the upper surface of the engaging projection 31 is formed into the inclined surface 32, excessively large gap G provided between the upper surface of the engaging projection 31 and the lower end of the engaging portion 30 does not cause looseness to occur if the joining belt for securing the mount base 25 to the fuel tank 14 is loosened or if no joining bolt is used. As a result, the hermiticity of the fuel tank 14 can be improved.

What is claimed is:

1. A combination, comprising:
   a fuel tank of a vehicle comprising:
      a fuel supply port having an engaging portion formed therein; and
   a cap unit comprising:
      a cap body disposed in the fuel supply port;
      a lock bar extending from a side portion of the cap body and engaging the engaging portion of the fuel supply port; and
      an engaging projection extending from another side portion of the cap body substantially opposite from the lock bar, the engaging projection having a surface inclining upwardly toward a center portion of the cap body, the inclining surface spaced apart from the engaging portion and movable to engage the engaging portion to prevent the cap body from being pulled out from the fuel supply port.

2. The combination of claim 1, wherein the lock bar is retractable from a locked state where the lock bar engages the engaging portion to an unlocked state where the lock bar disengages from the engaging portion.

3. The combination of claim 2, wherein the fuel tank further includes a securing portion disposed outside the fuel supply port and the cap unit further includes a mount base mounted to the securing portion, the mount base having a pivot shaft to rotate the mount base and thereby rotate the cap body extending from the mount base out of the fuel supply port when the lock bar is in the unlocked state.

4. The combination of claim 3, wherein the pivot shaft of the mount base is disposed outside the cap body substantially opposite from the lock bar so that the engaging projection is inside a rotational arc formed by the center portion of the cap body rotating out of the fuel supply port.

5. The combination of claim 4, wherein the lock bar is retractable to one side of the cap body outside the rotation arc formed by the center portion of the cap body rotating out of the fuel supply port.

6. The combination of claim 3, wherein, when the lock bar is in the locked state with the engaging projection spaced apart from the engaging portion, the inclining surface of the engaging projection is parallel to a tangent of an imaginary arc at a lower end of the engaging portion, the imaginary arc being drawn to pass through the lower end of the engaging portion with the pivot shaft as a center thereof.

7. The combination of claim 1, wherein the engaging portion is formed by bending inwardly an opening end portion of the fuel supply port.

* * * * *